US010427084B1

(12) United States Patent
Rhodes, Jr.

(10) Patent No.: US 10,427,084 B1
(45) Date of Patent: Oct. 1, 2019

(54) SYSTEM AND METHOD TO COMBINE A FILTER SYSTEM WITH A FREEZE DRYER TO FILTER CONTAMINATION OF A VACUUM PUMP

(71) Applicant: Jesse W. Rhodes, Jr., Moncks Corner, SC (US)

(72) Inventor: Jesse W. Rhodes, Jr., Moncks Corner, SC (US)

( * ) Notice: Subject to any disclaimer, the term of this patent is extended or adjusted under 35 U.S.C. 154(b) by 0 days.

(21) Appl. No.: 16/444,108

(22) Filed: Jun. 18, 2019

(51) Int. Cl.
| | |
|---|---|
| *F26B 5/06* | (2006.01) |
| *B01D 46/00* | (2006.01) |
| *B01D 47/02* | (2006.01) |
| *B01D 53/14* | (2006.01) |
| *B01D 53/18* | (2006.01) |
| *B01D 36/04* | (2006.01) |
| *B01D 35/157* | (2006.01) |
| *B01D 5/00* | (2006.01) |
| *B01D 36/00* | (2006.01) |
| *A23L 3/36* | (2006.01) |
| *B01D 17/02* | (2006.01) |

(52) U.S. Cl.
CPC ............ *B01D 47/021* (2013.01); *A23L 3/363* (2013.01); *B01D 5/006* (2013.01); *B01D 17/02* (2013.01); *B01D 35/1573* (2013.01); *B01D 36/003* (2013.01); *B01D 36/04* (2013.01); *B01D 46/0019* (2013.01); *B01D 46/0023* (2013.01); *B01D 53/1425* (2013.01); *B01D 53/18* (2013.01); *F26B 5/06* (2013.01); *A23V 2002/00* (2013.01); *B01D 2252/20* (2013.01)

(58) Field of Classification Search
CPC ....... F26B 5/06; B01D 46/00; B01D 46/0019; B01D 46/0023
USPC ....................................... 34/298, 79
See application file for complete search history.

(56) References Cited

U.S. PATENT DOCUMENTS

| | | | |
|---|---|---|---|
| 4,561,191 A * | 12/1985 | Parkinson | ............... A23L 3/44 34/290 |
| 5,996,248 A | 12/1999 | Coppa | |
| 9,459,044 B1 | 10/2016 | Haddock et al. | |
| 9,739,532 B2 | 8/2017 | Baugh et al. | |
| 10,309,723 B2 * | 6/2019 | Tsubata | ................... F26B 5/06 |

* cited by examiner

*Primary Examiner* — Robert A Hopkins
(74) *Attorney, Agent, or Firm* — Vincent G. LoTempio; Kloss, Stenger & LoTempio; David T. Stephenson

(57) ABSTRACT

The present invention relates to a system and method for providing a filter to prevent contamination of vacuum pumps during use with freeze dryers. The system and method comprising of a vacuum pump connected to a freeze dryer, the vacuum pump evacuating pressure from the freeze dryer; the vacuum pump connected to a coalescing filter at least partially collects water vapor and the particulate gas, whereby the particulates in the particulate gas are at least partially separated from the gas, the coalescing filter further separating the oil from the water and particulates, whereby the oil is rejuvenated for use with the oil composition; an oil control valve to control pressure in the system and maintain a level of oil in the vacuum pump; a drain valve to enable draining of impurities, and a final filter that injects air into oil exchanged between the sedimentary filter and vacuum pump.

20 Claims, 6 Drawing Sheets

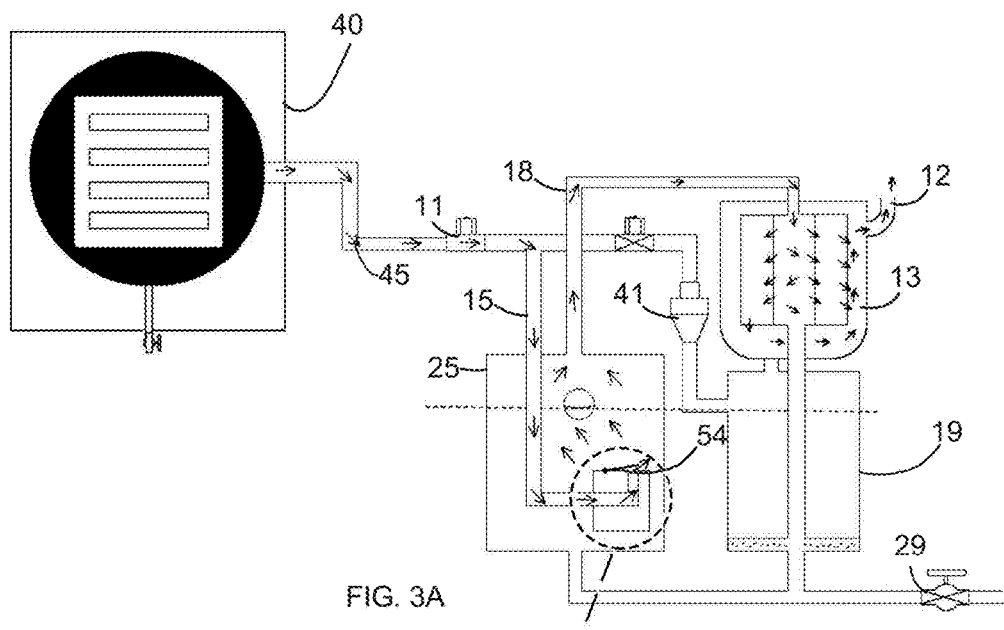
FIG. 3A
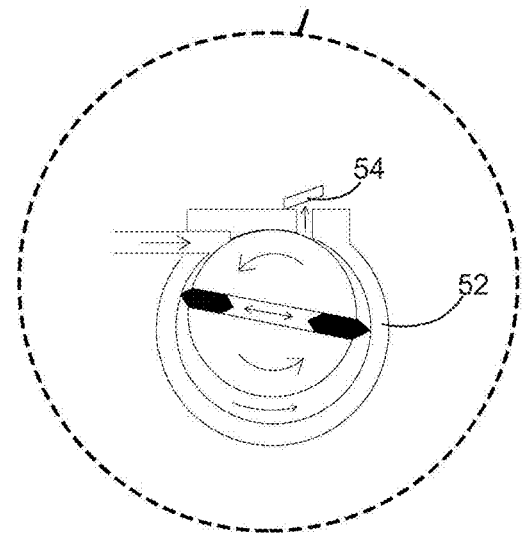

SYSTEM AND METHOD TO COMBINE A FILTER SYSTEM WITH A FREEZE DRYER TO FILTER CONTAMINATION OF A VACUUM PUMP

FIELD OF THE INVENTION

The present invention relates to a filtration system and method, and particularly to a filtration system and method that filters oil and contamination of vacuum pumps used with freeze dryers.

BACKGROUND OF THE INVENTION

Vacuum pumps can be used in a number of different operations. In some instances, vacuum pumps can be designed to be used on air conditioners and will still function even when containing ferrous metal parts. However, when they are used in the application of a freeze dryer, rust contaminates the system and thereby creates problems in the operation. For example, after use, the vacuum pump becomes full of rust water and particulate. In order to keep the system operational after normal use, the system needs to be cleaned and re-lubricated with large amounts oil, which require hours to accomplish.

Previous attempts have tried to solve this problem in the past by using a vacuum pump's motor to move oil through a 7 micron car oil filter at a rate of six cubic feet of oil per minute. However, the pump's reservoir creates an extremely high amount of pressure. The high pressure leads to problems and several mishaps have occurred, which include sight glasses blowing out and the covers of the reservoirs rupturing.

Additionally, several designs were created as an attempt to filter contaminated oil. Some designs attempted to filter the contaminated oil by circulating the oil from the vacuum pump's drain through a filter and back into the oil fill, which necessitates using additional pumps and filters. But these designs failed to adequately clean the oil and the internal parts of the pump. Thus, there is a long felt need in solving the aforementioned problems.

SUMMARY OF THE INVENTION

The present disclosure generally comprises a system and method for providing a filter to prevent contamination of a vacuum pump during use with a freeze dryer. The filter system for filtering an oil composition in a vacuum pump used with a freeze dryer, comprising: a rotary switch having a pre-seal/seal mode position, a freeze dry mode position, and an exchange mode position, a vacuum pump connected to a freeze dryer through a vacuum hose, the vacuum pump evacuating pressure from the freeze dryer, the vacuum pump comprising a reservoir containing an oil composition; an exhaust hose connecting the vacuum pump to a coalescing filter, wherein the coalescing filter at least partially collects water vapor and the particulate gas, the coalescing filter further coalescing the water vapor, and the particulate gas into oil, water, and particulates, whereby the particulates in the particulate gas are at least partially separated from the gas, the coalescing filter further separating the oil from the water and particulates, whereby the oil is rejuvenated for use with the oil composition; an oil control valve to control pressure in the system and maintain a level of oil in the vacuum pump; a vent and an exhaust hose injecting clean air into the rejuvenated oil; a drain valve to enable draining of impurities, and a final filter that injects air into oil exchanged between the sedimentary filter and vacuum pump.

The method for filtering an oil composition in a vacuum pump used with a freeze dryer, comprising: freezing a medium in a freeze dryer; switching a rotary switch to a freeze drying mode position from pre-seal/seal mode position; evacuating, with a vacuum pump, pressure from the freeze dryer through a vacuum hose, the vacuum pump comprising a reservoir containing an oil composition, whereby the frozen medium sublimates from a solid to a sublimated gas, whereby the sublimated gas migrates from the freeze dryer into the oil composition in the vacuum pump to form a particulate gas mixed with the oil composition; monitoring, through a reservoir sight glass, the level of the oil composition in the reservoir of the vacuum pump; waiting a predetermined time for the vacuum pump to cool (a temperature in a range of about 60° to 80° F.); opening an oil flow control valve; circulating the oil composition between the coalescing filter, the sedimentary filters and the vacuum pump, whereby low pressure generated by the vacuum pump enables flowage of the oil composition; at least partially collecting condensation and water vapor that evaporates from the oil composition through an exhaust hose; at least partially collecting, in a sedimentary filter, rust, particulates, and water from the oil composition; at least partially collecting, in a coalescing filter, water vapor and the particulate gas; coalescing, in the coalescing filter, the water vapor, and the particulate gas into oil, water, and particulates, whereby the particulates in the particulate gas are at least partially separated from the gas; separating, in the coalescing filter, the oil from the water and particulates, whereby the oil is rejuvenated for use with the oil composition; injecting clean air from a vent and an exhaust hose into the rejuvenated oil; at least partially collecting, in the sedimentary filter, water from the rejuvenated oil; closing the oil flow control valve; allowing the oil in the system to move to a clean oil storage section of the sedimentary filter; exchanging hot oil with cool filtered oil by and switching the rotary switch from freeze drying mode position to exchange mode position, mixing air with the exchanged oil using a final filter, waiting a predetermined amount of time; and switching on the rotary switch from exchange mode back to freeze drying mode.

A general object of the present disclosure is to provide a system and method for filtering an oil composition in a vacuum pump.

Another object of the present disclosure is to provide a system and method that can be used with frozen mediums, in which the system and method can filter oil and contamination.

Still another object of the present disclosure is to provide a filtration system used with a freeze dryer to eliminate contamination of rust, water and gas particulate residue from a vacuum pump used with a freeze dryer.

Still another object of the present disclosure is to provide a filtration system that will collect water vapor and particulate gasses and coalesce the water vapor and particulate gasses back into oil, water and particulates, trapping the water and particulate and returning the oil back to the vacuum pump without the need to drain or replace the oil.

Still a further object of the present disclosure is to provide a filter system that has a rotary switch that will move power and control of the vacuum pump from the freeze dryer to an alternative power source.

Still another object of the present disclosure is to provide a filter system that eliminates the exhaust of oil gas and oil mist.

Still a further object of the present disclosure is to provide a system that can filter during a freezing cycle of a freeze dryer.

Still another object of the present disclosure is to provide a filter system that uses a mixture of air and oil to also help absorb water from the oil into the air bubbles and remove particulate.

Still a further object of the present disclosure is to provide a filter system that significantly lowers the noise level of a vacuum pump when used with a freeze dryer.

Still another further object of the present disclosure is to make the combination of a vacuum pump used with a freeze dryer in which both are compatible with each other and can be easy to install and operate.

Still another object of the present disclosure is to provide a filter system that makes automotive and home air conditioner vacuum pumps compatible with freeze dryers.

Still a further object of the present disclosure is to provide a filter system that makes a freeze dryer compatible with a rotary vane vacuum pump.

Another further object of the present disclosure is to provide a filter system capable of exchanging of oil quickly and easily while effectively reducing the mess associated with filtering oil.

Other systems, devices, methods, features and advantages of the disclosure will be further understood and appreciated by those skilled in the art by reference to the following written specification, claims and appended drawings.

It is intended that all such additional systems, methods, features, and advantages be included within this description, be within the scope of the present disclosure, and be protected by the accompanying claims.

BRIEF DESCRIPTION OF THE DRAWINGS

FIG. 3A is a sectional view of a non-limiting embodiment of the present disclosure in pre-sea/seal mode.

DETAILED DESCRIPTION OF THE INVENTION

Figure 1:
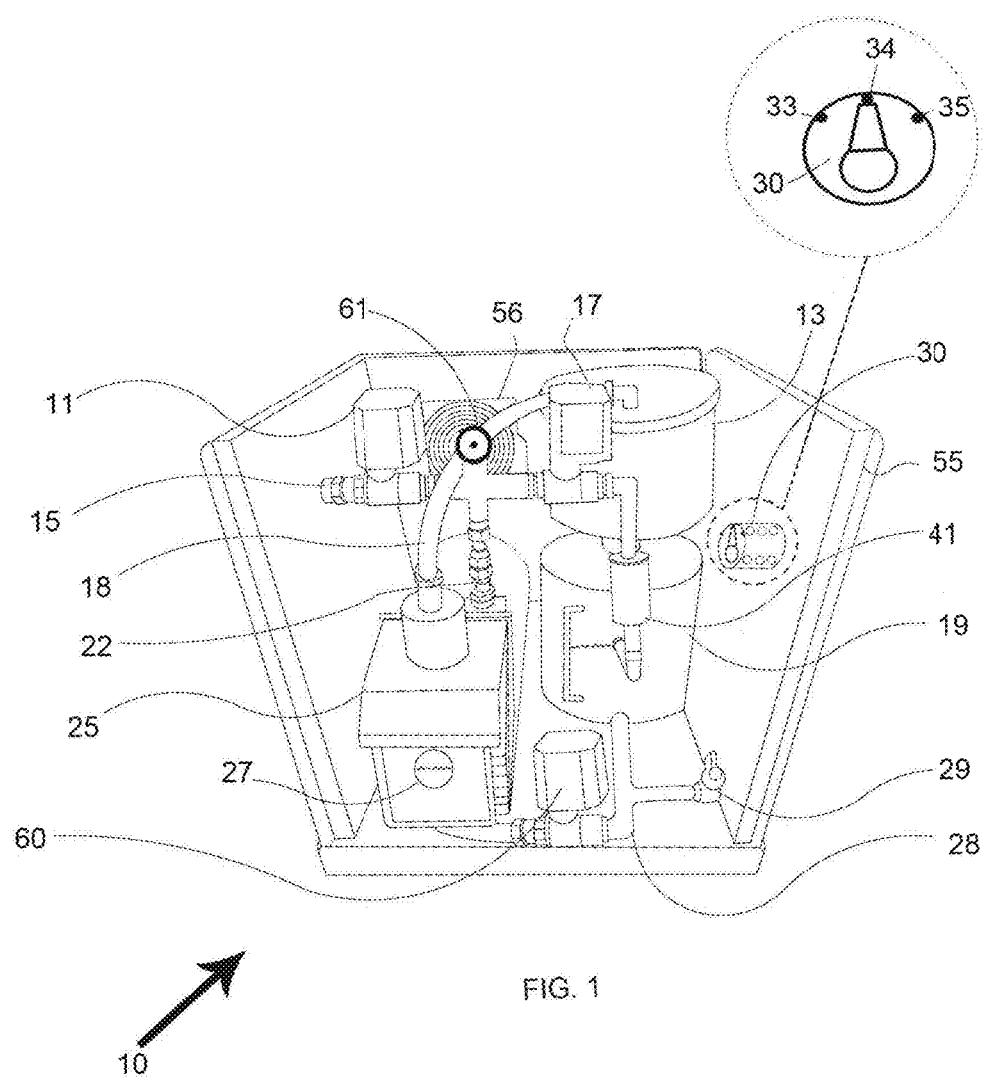
FIG. 1 is a perspective view of a non-limiting embodiment of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Currently, freeze dryers require a deep vacuum and commonly use a vacuum pump designed to be used on a dry system, which contain ferrous metal parts. However, since vacuum pumps are designed for dry systems, they do not tolerate water. As a result, the pump collects water vapor and particulate gases while maintaining a vacuum on a freeze dryer. In order to keep the system operational, it is necessary to perform hours of cleaning and to re-lubricate the system with large amounts oil.

There are two basic cycles when using a freeze dryer and a vacuum pump: a nine hour freezing cycle and a freeze drying cycle. The purpose of the freezing cycle is to cool the drum of the freeze dryer to −40 to −80 degrees Fahrenheit to prevent products or frozen mediums such as, but not limited to, food products from gassing during the vacuuming process and to make the freeze dryer drum as cold as possible. The food freezes, although when the next cycle starts (freeze drying), the food temperature is heated and lowered to maximize sublimation. The vacuum pump is not in use while the freeze dryer is in the freezing cycle.

The second cycle is the freeze drying cycle. The vacuum pump is turned on, thereby pulling a deep vacuum. The heater under the food or product is activated. Moreover, frozen foods or products cannot melt while in a vacuum. The frozen liquid in the food will sublimate and go from a solid directly to a gas. When the gas comes in contact with the cold walls of the freeze dryer drum, it de-sublimates into a solid. The result is freeze dried food.

The gasses expand during this process, causing a loss of vacuum pressure. The vacuum pump continues to run to maintain a vacuum. Rotary vane pumps can be used to create the needed vacuum. Some sublimated gasses will migrate from the freeze dryer through the connecting vacuum hose, in a deep vacuum environment into the oil of the vacuum pump. The oil's environment is not a vacuum and its temperature is too cold to cause the gasses to sublimate and too hot to cause de-sublimation.

These gasses are trapped in the oil within the vacuum pump when the environment changes to no vacuum and 160 degrees Fahrenheit. The water vapor and particulate gasses will stay there until it is either heated to evaporate or cooled to de-sublimate. The other alternatives are to remove the oil from the pump while it's hot and filter it or replace it. If water vapor and particulate are left in the pump, it will cause rust and collect water and the de-sublimated elements from the food.

Although there are generally two basic cycles, a third cycle or mode may be incorporated. The third cycle or mode may be, but not limited to, an exchange cycle/mode, in which hot oil is exchanged with cool oil. A final filter may be used during exchange mode. When a final filter is utilized during exchange mode, clean oil runs through the final filter from the sedimentary filter into the vacuum pump. As oil runs through the final filter, air is mixed with the oil and an emulsion forms, which assists in absorbing any remaining moisture. During exchange mode, the system is unable to produce high oil pressure because it is being vented.

Another non-limiting cycle or mode that can be utilized in addition to the modes and cycles mentioned above is a pre-seal/seal mode. Pre-seal/seal mode can be used after 9 hours of freezing when vacuuming to seal the system. Pre-seal/seal mode can be used when the drum is warm and pliable. After sealing, the system can be switched to freeze drying mode.

Cleaning the freeze drying system is possible. The only alternative to cleaning the system is to remove the oil from the vacuum pump while it's hot and either replace it or wait until the oil temperature is cold enough to filter. If left in the pump, it will cause major contamination such as rust from ferrous parts, water, and particulate. Particulate are certain elements that sublimate from food.

It should also be noted that vacuum pumps are made for outside use and are often very noisy. They also have a problem with oil mist and spray coming from the pump's exhaust. If the pump is overfilled, it can spray oil out from the intake. Also, if left unattended after the final dry cycle, oil can escape. The pump's check valve can fail and oil can contaminate the freeze dryer through the vacuum hose The present disclosure generally comprises a system and method for providing a filter system to prevent contamination of a vacuum pump during use with a freeze dryer.

Averting to the drawings, FIG. 1 illustrates a filter system 10 of the present disclosure comprising a freeze dryer 40 (shown in FIGS. 3A and B), which is connected to vacuum pump 25 via vacuum hose connection 15. Vacuum pump 25 is connected to a coalescing filter 13 by exhaust hose 18, and coalescing filter 13 is attached to sedimentary filter 19. Sedimentary filter 19 collects rust, particulates, and water as the oil is moved through it. Sedimentary filter 19 is connected to drain hose 28, which has drain valve 29. Drain valve 29 is used to periodically drain collected contaminates. Additionally, sedimentary filter 19 is connected to final filter 41 which is used to inject air into filtered oil.

The filter system for filtering an oil composition in a vacuum pump used with a freeze dryer, comprising: a vacuum pump that comprises a check valve and a reservoir containing an oil composition, the vacuum pump operationally connected to a freeze dryer through a vacuum hose, the vacuum pump evacuating pressure from the freeze dryer; a sedimentary filter and a clean oil storage section;
a coalescing filter comprising a core; wherein the coalescing filter at least partially collects water vapor and the particulate gas, the coalescing filter further coalescing the water vapor, and the particulate gas into oil, water, and particulates, whereby the particulates in the particulate gas are at least partially separated from the gas, the coalescing filter further separating the oil from the water and particulates, whereby the oil is rejuvenated for use with the oil composition; a reed valve operational in the vacuum pump, the reed valve enabling passage of the oil composition and clean air for generating pressure in the reservoir of the vacuum pump; an oil control valve controlling the generated pressure to a predetermined pressure during circulation of the oil composition, the oil control valve further maintaining the oil composition at a predetermined level in the vacuum pump; a filter drain enabling oil drainage; a vent enabling passage of the clean air into the rejuvenated oil;
an exhaust hose in communication with the vent, the exhaust hose carrying the clean air to the rejuvenated oil; a final filter to mix air with oil;
a rotary switch for switching the system between a pre-seal/seal mode position, to a freeze drying mode position; to an exchange mode position, a first power source powering the system in the freeze drying mode; and a second power source powering the system in pre-seal/seal mode and exchange mode.

Filtration can occur during the freeze drying cycle/mode when the pump and oil has had a chance to cool to a pre-determined temperature so that de-sublimation can occur. The short period of time it takes for the temperature change will not be sufficient to contaminate the pump. Filtration can be performed with the freeze dryer off or in a freezing mode as long as the temperature of the oil in the pump is at about room temperature. The water and particulate vapor that migrates through vacuum hose 15 into the oil is trapped in the oil due to the environmental change. Oil cannot be filtered if the oil is at a temperature where the particulates are in a gaseous state (sublimated). High temperature will cause sublimation whereas decreasing the temperature will cause de-sublimation (a temperature in a range of about 60° to 80° F., depending on the amount of particulates in the oil). Once the gasses have returned to their original state, they can be filtered and removed, leaving the oil clean.

Filtration during freeze drying mode may occur when rotary switch 30 is moved from a pre-seal/seal mode position 33 to freeze drying mode position 34 and oil flow control valve 17 is open. Oil flow control valve 17 can be left fully open or adjusted for noise and rate of oil flow. Rotary switch 30 has three positions for different modes, pre-seal mode position 33, freeze drying mode position 34, and exchange mode position 35.

Exhaust hose 18 collects and recycles condensation being evaporated from the oil during the entire drying cycle. The exhaust hose provides a path to exhaust the air drawn into the vacuum pump into the inner core of the sedimentary filter 19, through coalescing filter 13 and out of vent 12 (shown in FIGS. 3A and C).

Oil flow control valve 17 is used to turn on the oil flow and controls the flow rate. When the system is in freeze drying mode, oil flow control valve 17 is closed and vacuum control valve 11 is open. Drain valve 29 and check valve 60 are also closed.

The function of coalescing filter 13 is to coalesce oil vapor back into oil and keep it out of the environment. Coalescing filter 13 allows water vapor to escape through vent 12. If the oil is condensed, it will be trapped by the sedimentary filter 19 as the oil settles back into the vacuum pump. Coalescing filter 13 is preferably but not limited to, a 0.3 micron coalescing type filter that will collect oil mist, smoke or oil that may be ejected from the exhaust and return it to a reservoir in vacuum pump 25.

Coalescing filter 13 also causes the water vapor and condensation to condense back to water to be trapped. Particulates and rust are filtered out of the oil and are trapped in the sedimentary filter 19. Coalescing filter 13 will also reduces the noise created by the vacuum pump. With the coalescing filter installed, the noise level is significantly reduced, thus allowing users to keep their freeze dryer and vacuum pump indoors with their other appliances. Moreover, acoustic covering 55 can reduce noise even further.

Vacuum pump 25 has a reservoir sight glass 27 that is used to monitor the oil level in the reservoir while vacuum gauge 61 provides level measurements. Vacuum pump 25 is connected to vacuum intake block 22. Drain hose 28 and drain valve 29 are used remove oil when the level oil reaches a certain level. Cooling fan 56 is used to cool down the system when needed. Acoustic covering 55 can also potentially seal the system and contain any oil that leaks or spills during operation. When the freeze dryer is in its nine hour freezing cycle, power to vacuum control valve 11 and vacuum pump 25 are turned off.

Figure 2A:
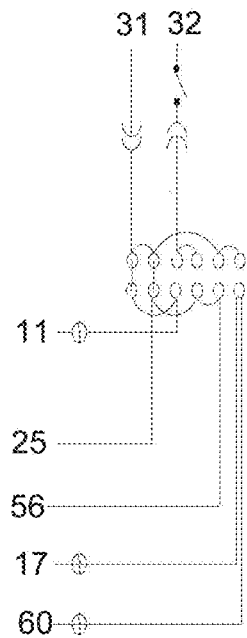
FIG. 2A is a diagram showing a non-limiting embodiment of the electrical circuit of the filter system in pre-seal/seal mode.
Figure 2B:
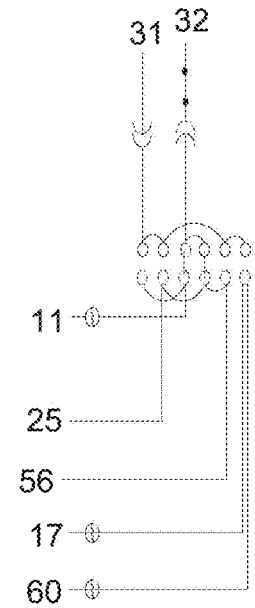
FIG. 2B is a diagram showing a non-limiting embodiment of the electrical circuit filter of the filter system in freeze drying mode.
Figure 2C:
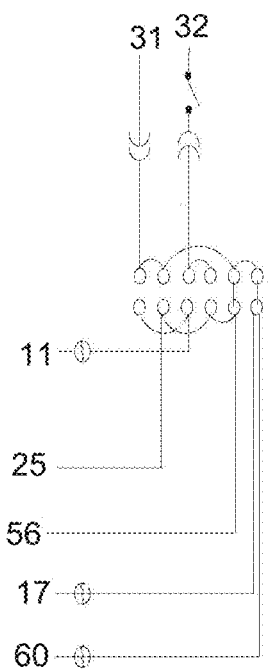
FIG. 2C is a diagram showing another non-limiting embodiment of the electrical circuit of the filter system in exchange mode.

FIGS. 2A, 2B, and 2C are wiring diagrams for the filtration system. FIG. 2A is a diagram showing a non-limiting embodiment of the electrical circuit of the present disclosure in pre-seal/seal mode. There are two sources of power to the rotary switch 30, first power source 31 and second power source 32. First power source 31 can be controlled by logic circuits and a relay board in the freeze dryer. It turns vacuum control valve 11 and vacuum pump 25 off during freezing cycle for nine hours. During pre-seal mode and exchange mode, power is supplied from second power source 32.

When the system is switched to pre-seal/seal mode by rotary switch 30, vacuum pump 25 is powered by second power source 32. Vacuum control valve 11 is kept in the open position or on position by the rotary switch 30. Fan 56 is also turned on in pre-seal/seal mode while oil flow control valve 17 and check valve 60 are closed.

FIG. 2B is a diagram showing a non-limiting embodiment of the electrical circuit filter of the present disclosure in freeze drying mode. FIG. 2B illustrates the condition of the circuits in freeze drying mode. During freeze drying mode, power is supplied from first power source 31 and the relay board switch is closed. Moreover, when rotary switch 30 is in the freeze drying mode position 34, the freeze dryer is in control as shown in freeze dry configuration 34b. Vacuum control valve 11 and vacuum pump 25 are turned on by the freeze dryer relay during drying. After the final dry is completed, the freeze dryer relay turns off the vacuum control valve 11 and vacuum pump 25.

In freeze drying mode, the vacuum pump 25 is turned on to pull a vacuum. Power is supplied to vacuum control valve 11, which remains closed until it receives power and is opened to provide a path to the vacuum chamber. At the end of final dry cycle, the relay board drops power to the vacuum control valve 11 and turns off the vacuum motor. The vacuum pump has a check valve to prevent the freeze driver from sucking the oil from the vacuum pump into the freeze dryer. If the vacuum does not decrease, then the vacuum may slowly decrease from gassing or leaks. At some point, the check valve will fail and what ever vacuum is left will suck the oil into the vacuum chamber. The normally closed vacuum control valve 11 will prevent this failure. Fan 56 is also turned on during freeze drying mode. Check valve 60 can be off during this mode.

FIG. 2C illustrates a non-limiting wiring diagram of the electrical circuit of the filter system of the present disclosure in exchange mode. Oil flow control valve 17 is open and the filtration system receives power from the second power source 32. Vacuum pump 25 and fan 56 are also turned on during exchange mode. Moreover, power is also supplied to check valve 60.

FIG. 3A is a sectional view of the filter system of the present disclosure during pre-seal/seal mode. Pre-seal/seal mode can be set using rotary switch 30 to pre-seal/seal mode position 33. Pre-seal/seal mode will remove enough air to seal the freeze dryer 40 and ensures the drum is sealed before the 9 hour freezing cycle, which helps prevent vacuum failure. The drum of freeze dryer 40 is closed during freezing. Air is pumped from freeze dryer 40, through vacuum pump 25, up exhaust 18, into coalescing filter 13, and out vent 12. Vacuum control valve 11 is open and vacuum pump 25 is activated which pulls a light vacuum. Flow direction 45 travels throughout vacuum hose 15 and out of reed valves 54. Rotating vanes 52 can rotate and pull the oil and air into the pump reservoir. Oil flow control valve 17 and drain valve 29 are closed. Flow directions 45, for illustrative purposes, demonstrates flow directions in the filter system. To stop pre-seal/seal mode, switch pre-seal/seal mode position 33 on rotary switch 30 to freeze dry mode position 34.

Figure 3B:
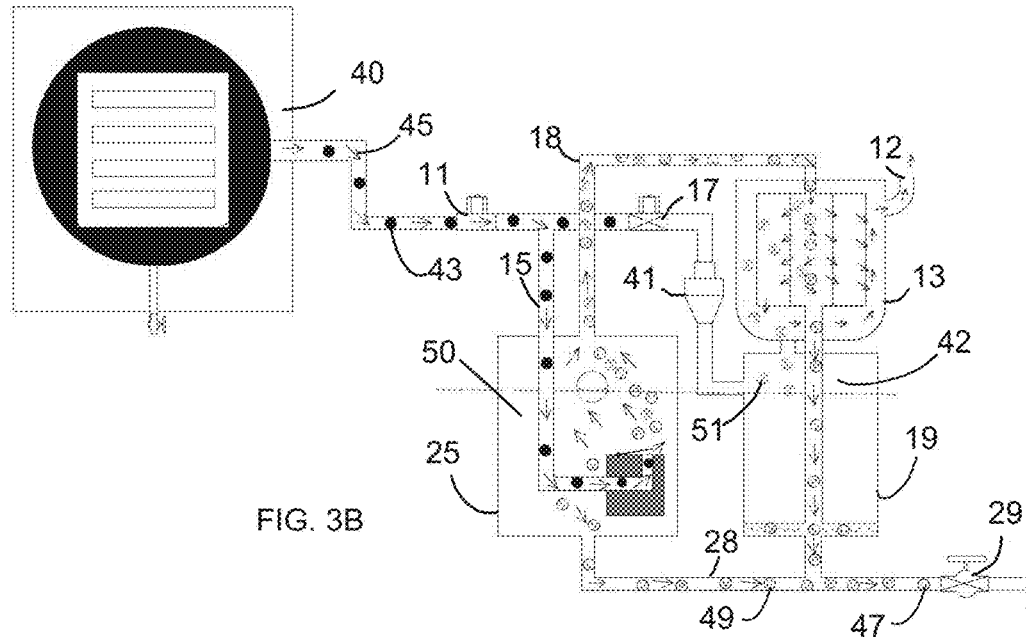
FIG. 3B is a sectional view of the present disclosure in freeze dry mode.

FIG. 3B is a sectional view of a filter system of the present disclosure shown in freeze drying mode. The system can be set in freeze drying mode by switching rotary switch 30 to freeze drying mode position 34. Once the product is loaded into the freeze dryer 40, it is frozen for nine hours it should reach a temperature of −40 to −80 degrees Fahrenheit. Vacuum pump 25 is turned on, pulling a deep vacuum. Heaters are turned on under the product raising and lowering its temperature "annealing," causing water and certain other elements in the food to sublimate (the food product going from a solid to a gas). When these gases come in contact with the vacuum chambers wall, it de-sublimates turning back into a solid ice. During this process, the food is gassing and causes a loss of vacuum. Vacuum pump 25 maintains the vacuum. Moreover, the vacuum and temperature will raise and lower, causing maximum sublimation.

The vacuum chamber and vacuum hose 15 connecting the freeze dryer 40 to the vacuum pump 25, all share the same environment. This environment does not support any liquid elements and only gasses will travel through the vacuum hose into the vacuum pump's 25 oil. Once these gasses enter the oil, the environment changes and the gasses are suspended in the oil and will remain there until it changes. If the oil is allowed to cool, the gasses will return to their original state, contaminating the pump. Some of the particulates, condensation, and water will travel from vacuum pump 25 into drain hose 28. Flow directions 45, water vapor/particulate gases 43, condensation/water 47, particulate 49, and oil mist 51 are shown in FIG. 3A. During freeze drying mode, filter drain 29 is closed.

The incompatibility between the vacuum pump and the freeze dryer produces an excess of water vapor and particulate (gases) that migrate into the vacuum pump's oil. Filter system 10 removes these gasses from the freeze dryer's oil. In the freeze drying mode, any gasses that pass through reed valves 54 and oil that are not trapped will evaporate through the filter system vent 12.

The oil mist from vacuum pump 25 travels into exhaust hose 18 and is then directed into the core of coalescing filter 13 (preferably, but not limited to a 0.3 micron filter), causing the trapped water and particulates to coalesce back to water and particulate as it passes through the filter element.

After oil passes through coalescing filter 13, it travels into sedimentary filter 19. Oil that coalesced from oil mist travels to the clean oil storage section 42. Oil can be stored in the clean oil storage section 42 for 2 to 3 days. The oil will be filtered and cleaned when oil is being stored in clean oil storage section 42 and clean oil will move up to the top of clean oil storage section 42. Impurities are continually collected, with materials that are heavier than the oil moving to the bottom of the sedimentary filter while materials lighter than oil are routed to and through the coalescing filter. When impurities are completely de-sublimated, they will fall into the dirty section of the sedimentary filter to be expelled through a 0.3 micron filter. Only oil mist is coalesced through the cartridge and returned to the clean oil section 42. The water and particulate gasses are de-sublimated and routed from the filter core to the bottom of sedimentary filter 19.

Pressure will cause oil to move into the bottom of the inner core of coalescing filter 13. The water and particulate gasses that are trapped in the oil are de-sublimated as the oil cools, returning the particulate gasses to the original state of water and whatever elements the particulates were before sublimation. As the water and particulates are pushed through the coalescing filter by exhaust gasses, the water will evaporate or be coalesced into water droplets. Particulates turns into multi-color jell and other unknown particles. As the air and clean filtered oil comes through the coalescing filter, it is moved through the system again by the pressure of the vacuum.

Pressure accumulates in the reservoir as clean oil and air becomes available. It can only develop as much pressure as the amount of oil that is being filtered and moved into the vacuum pump 25. As the pressure increases, it pushes air up into the center core of the coalescing filter and oil into the bottom of the center core of the coalescing filter. As the air and oil is filtered at its own rate "through the 0.3 micron filter" it keeps the pressure under control.

Turning the oil control valve 17 off can cause the vacuum pump to pull a vacuum. Pressure can be adjusted with the oil control valve 17 to keep the oil in the pump at a reasonable level. As the air and oil comes through reed valve 54 into the pump's reservoir 50, it creates pressure in the reservoir. The amount of pressure is controlled by oil flow control valve 17. If the valve is closed, oil cannot flow and results in zero pressure. If the valve is fully opened, the pressure generated will be limited by the amount of air and oil allowed to flow. This pressure control makes the system safe to operate.

Using the vacuum pump 25 to move the oil through coalescing filter 13 safely is accomplished by the vacuum pressure in the system pushing the oil and clean air from the outer core of the filter and through all parts of vacuum pump 25 at a very low pressure less than 2500 Torr. The oil level can be viewed through the sight glass to determine the amount of rejuvenated oil that has returned to vacuum pump.

The system and method circulates oil composition to the coalescing filter through the pump to the sedimentary filter, removing water and particulates. Any rust picked up in the pump and on into the core of the coalescing filter, through the filter element. The oil then travels to the clean oil section of the sedimentary filter.

During the freeze drying process, the pump's oil acts as a filter, collecting any water vapor or particulate gasses migrating through the vacuum line while trying to maintain a vacuum while the freeze is sublimating (giving off gas). It is important to note that the vacuum pump is only used for filtering when it is not being used by the freeze dryer. The rotary switch removes the power source for the vacuum pump from the freeze dryer. The vacuum control valve closes the vacuum line. In this manner, the oil control valve allows the vacuum pump to vacuum the clean oil coming for through the coalescing filter and it also mixes clean air with clean oil.

Further, rotating vanes 52 (as seen in FIG. 3A) rotate and pull the oil and air into the pump reservoir, creating a pressure equal to the amount of oil that is filtered. The oil composition and clean air are released by the reed valves under the surface of the oil. It is significant to note that allowing the oil composition to cool to room temperature causes de-sublimation. Also, the oil will become clouded if there is contamination, which needs to be filtered until clean. During installation of the system, the oil level should be set so that when filtering, it stays in the site glass. This ensures that the pressure does not exceed the pressure required to move the oil composition. Also, it ensures that there is enough oil is in the pump to prevent damage.

In other words, the clean oil and some air is picked up as it comes out of the coalescing filter, causing the air to be displaced and pushed into the top core of the coalescing filter. The oil composition is displaced and pushed into the bottom core of the coalescing filter. The coalescing filter displaces as much air and oil as it filters. The configuration of the coalescing filter is vented to help in this cause. The system measures from zero and varies up to what is required to move the amount of that the filter can filter. The filter is preferably, but not limited to, a 0.3 micron coalescing filter.

Figure 3C:
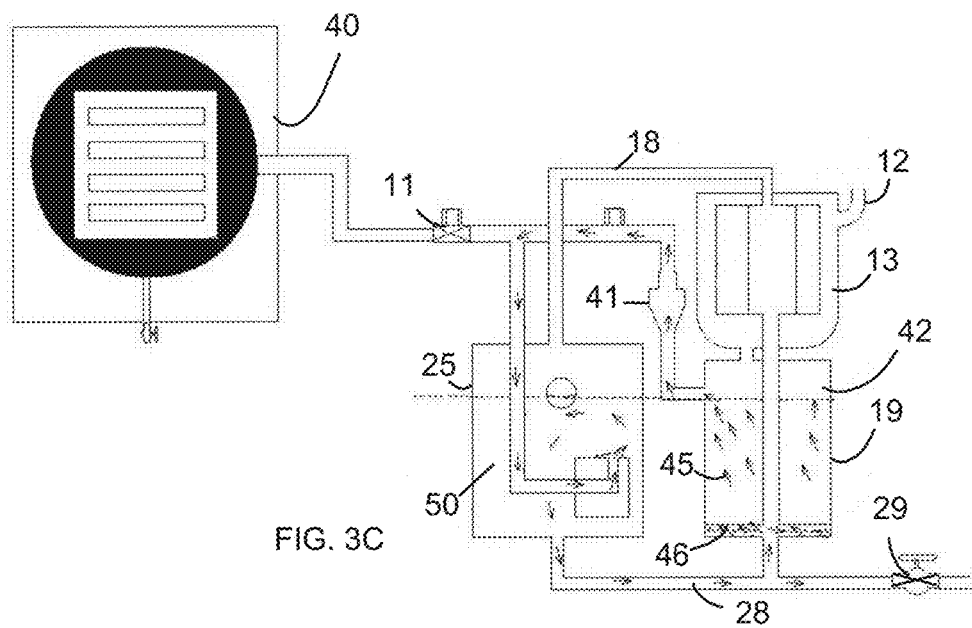
FIG. 3C is a sectional view of the present disclosure in exchange mode.

FIG. 3C is a sectional view of a filter system of the present disclosure during exchange mode. Exchange mode can be initiated by switching rotary 30 to exchange mode position 35 and exchange mode is initiated after freeze drying mode. During exchange mode, the oil travels from clean oil storage section 42 through the final filter 41 and into vacuum pump 25. Air mixes with the oil as it travels through final filter 41. Emulsions may form as oil and air into the final filter 41 and may assist with absorbing moisture. The vacuum pump 25 can only remove as much oil from the filter as much as it puts back into sedimentary filter 19. After traveling through final filter 41 and into vacuum pump 25, oil may either flow into the oil drain hose 28 or remain stationary in vacuum pump 25. Dirty oil 46 can settle in various places, including the bottom of sedimentary filter 19. During exchange mode, vacuum control valve 11 and drain valve 29 are closed while oil flow control valve 17 is open.

Impurities can be drained from the system. When draining the system, vacuum control valve 11 is closed while oil flow valve 17 is open and vacuum pump 25 needs to be shut off. Rotary switch 30 is set to exchange mode position 35. Drain valve 29 is open and attached to drain hose 28. Drain hose 28 is connected to sedimentary filter 19. Power draining can be accomplished by covering the opening of vent 12 and turning on vacuum pump 25. Closing drain valve 29 will stop the draining. After draining, rotary switch 30 is switched back to freeze drying mode position 34.

Figure 4A:
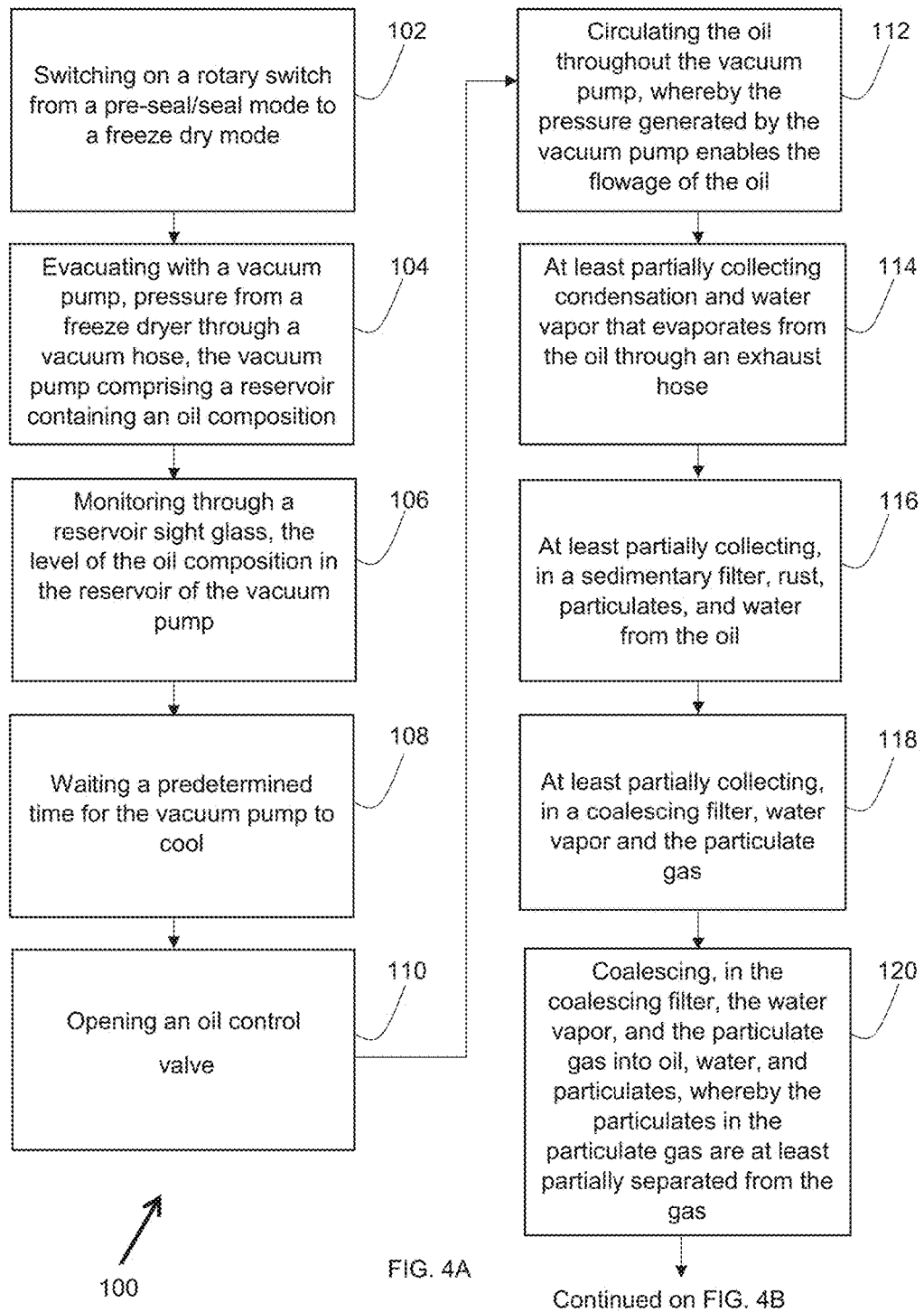
FIGS. 4A and 4B are flowcharts showing the steps of an exemplary and non-limiting method for filtering an oil composition in a vacuum pump used with a freeze dryer.
Figure 4B:
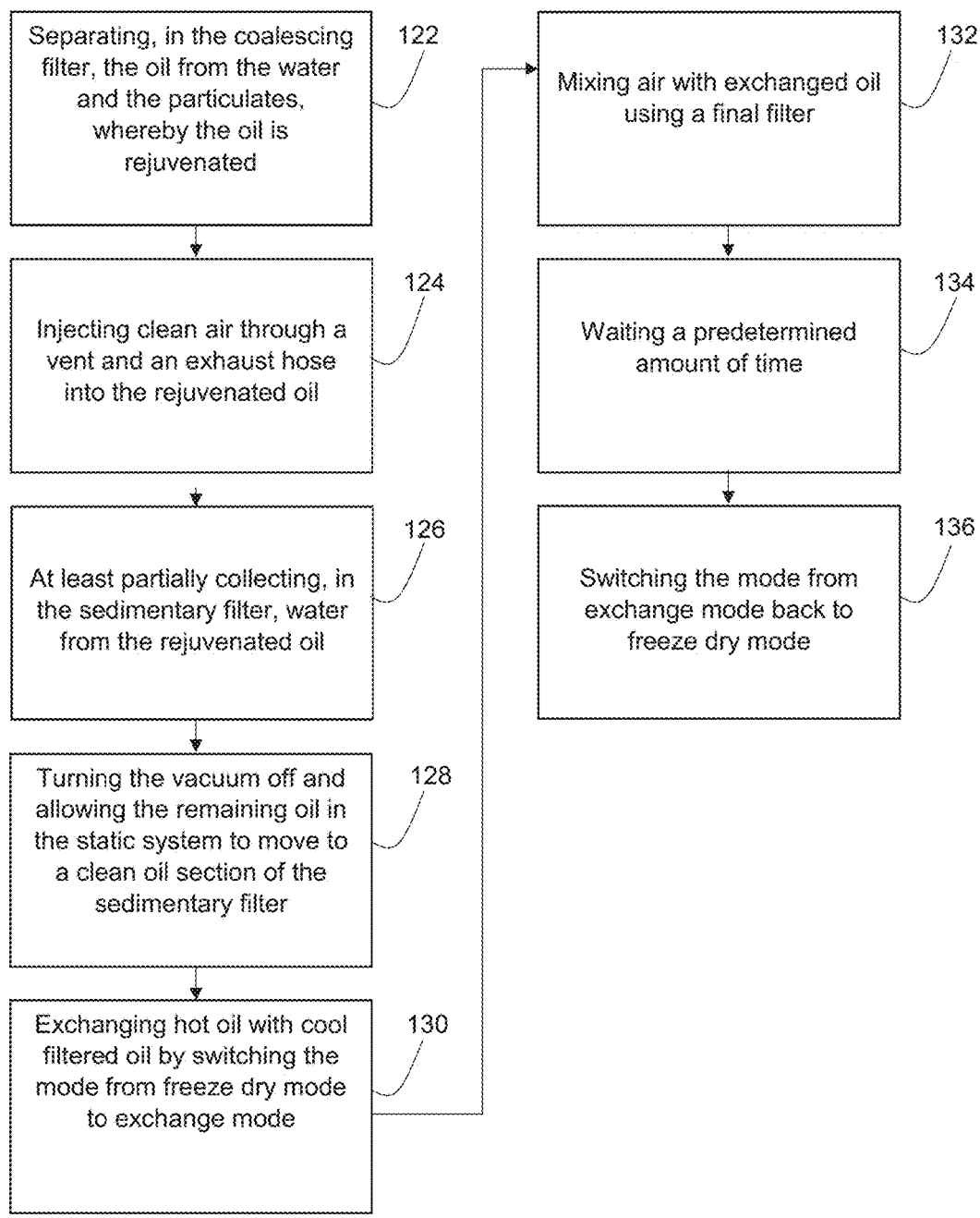

FIGS. 4A and 4B reference flowcharts showing the steps of an exemplary method 100 for filtering an oil composition in a vacuum pump used with a freeze dryer, the method comprising: changing the mode from a pre-seal/seal mode position to a freeze drying mode position, evacuating, with a vacuum pump, pressure from a freeze dryer containing a frozen medium through a vacuum hose, the vacuum pump comprising a reservoir containing an oil, whereby the frozen medium sublimates from a solid to a sublimated gas, whereby the excess sublimated gas migrates from the freeze dryer into the oil in the vacuum pump to form a particulate gas and water vapor mixed with the oil and trapped in the vacuum pump; monitoring, through a reservoir sight glass, a predetermined level of the oil composition in the reservoir of the vacuum pump; waiting a predetermined time for the vacuum pump to cool; opening an oil control valve; circulating the oil throughout the vacuum pump, whereby the pressure generated by the vacuum pump enables flowage of the oil; at least partially collecting condensation and water vapor that evaporates from the oil through an exhaust hose; at least partially collecting, in a sedimentary filter, rust, particulates, and water from the oil; at least partially collecting, in a coalescing filter, water vapor and the particulate gas; coalescing, in the coalescing filter, the water vapor, and the particulate gas into oil, water, and particulates, whereby the particulates in the particulate gas are at least partially separated from the gas; separating, in the coalescing filter, the oil from the water and the particulates, whereby the oil is rejuvenated; injecting clean air through a vent and an exhaust hose into the rejuvenated oil; at least partially collecting, in the sedimentary filter, water from the rejuvenated oil; allowing the oil to move a clean oil storage section of the sedimentary filter, exchanging hot oil with cool filtered oil by setting the rotary switch to an exchange mode position, waiting a predetermined amount of time, and switching the mode from exchange mode position back to freeze drying mode position.

The method 100 may include an initial Step 102 of switching on a rotary switch from a pre-seal/seal mode to a freeze dry mode. Step 104 includes evacuating, with a vacuum pump, pressure from a freeze dryer containing a frozen medium through a vacuum hose, the vacuum pump comprising a reservoir containing an oil composition, whereby the frozen medium sublimates from a solid to a sublimated gas, whereby the sublimated gas migrates from the freeze dryer into the oil composition in the vacuum pump to form a particulate gas mixed with the oil composition. The method 100 may further comprise a Step 106 of monitoring, through a reservoir sight glass, the level of the oil composition in the reservoir of the vacuum pump. A Step 108 includes waiting a predetermined time for the vacuum pump to cool.

A Step 110 includes opening an oil flow control valve. The valve may include a hand operated ball valve or other valves known in the art. A Step 112 may include circulating the oil composition between the filters and the vacuum pump, whereby the pressure generated by the vacuum pump enables flowage of the oil composition.

In some embodiments, a Step 114 comprises at least partially collecting condensation and water vapor that evaporates from the oil composition through an exhaust hose. Another Step 116 may include at least partially collecting, in a sedimentary filter, rust, particulates, and water from the oil composition. The method 100 may further comprise a Step 118 of at least partially collecting, in a coalescing filter, water vapor and the particulate gas. A Step 120 includes coalescing, in the coalescing filter, the water vapor, and the particulate gas into oil, water, and particulates, whereby the particulates in the particulate gas are at least partially separated from the gas.

In some embodiments, a Step 122 comprises separating, in the coalescing filter, the oil from the water and particulates, whereby the oil is rejuvenated for use with the oil composition. A Step 124 includes injecting clean air through a vent and an exhaust hose into the rejuvenated oil. In some embodiments, a Step 126 may include at least partially collecting, in the sedimentary filter, water from the rejuvenated oil. A Step 128 may include turning the vacuum off and allowing the remaining oil in the static system to move to clean oil storage of the sedimentary filter. This allows the sedimentary and rejuvenated oil to settle. The oil can then be viewed through the sight glass in the reservoir of the vacuum pump to determine quantity and cleanliness of oil.

A further Step 130 may comprise exchanging hot oil with cool filtered oil by switching the mode from freeze drying mode to exchange mode. The present disclosure may include Step 132 of mixing air with exchanged oil using a final filter. Yet another Step 134 may include waiting a predetermined amount of time. A final Step 136 may include switching the mode from exchange mode back to freeze drying mode on the rotary switch.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method for filtering an oil composition in a vacuum pump used with a freeze dryer, the method comprising:
    switching to a freeze dry mode position on a rotary switch,
    evacuating, with a vacuum pump, pressure from a freeze dryer containing a frozen medium through a vacuum hose, the vacuum pump comprising a reservoir containing an oil, whereby the frozen medium sublimates from a solid to a sublimated gas, whereby excess sublimated gas migrates from the freeze dryer into the oil in the vacuum pump to form a particulate gas and water vapor mixed with the oil and trapped in the vacuum pump; monitoring through a reservoir sight glass, a predetermined level of the oil composition in the reservoir of the vacuum pump;
    waiting a predetermined time for the vacuum pump to cool;
    opening an oil flow control valve;
    circulating the oil throughout the vacuum pump, whereby the pressure generated by the vacuum pump enables flowage of the oil;
    at least partially collecting condensation and water vapor that evaporates from the oil through an exhaust hose;
    at least partially collecting, in a sedimentary filter, rust, particulates, and water from the oil;
    at least partially collecting, in a coalescing filter, water vapor and the particulate gas;
    coalescing, in the coalescing filter, the water vapor, and the particulate gas into oil, water, and particulates, whereby the particulates in the particulate gas are at least partially separated from the gas;
    separating, in the coalescing filter, the oil from the water and the particulates, whereby the oil is rejuvenated;
    injecting clean air through a vent and an exhaust hose into the rejuvenated oil;
    at least partially collecting, in the sedimentary filter, water from the rejuvenated oil;
    allowing the oil to move to a clean oil storage section of the sedimentary filter;
    switching from freeze dry mode position to exchange mode position;
    exchanging hot oil with cool filtered oil and creating exchanged oil;
    mixing air with exchanged oil using a final filter;
    waiting a pre-determined amount of time;

switching the rotary switch position from exchange mode position to freeze dry mode position.

2. The method of claim 1, whereby the pressure generated by the vacuum pump occurs as a series of pump vanes turn and cause suction at an intake block, pulling clean air from the vent and oil that has been pushed through the coalescing filter, through the return hose to the pump vanes and the exiting through a series of reed valves into the oil reservoir.

3. The method of claim 1, further comprising a step of closing the oil flow control valve.

4. The method of claim 1, further comprising a step of switching on a rotary switch from the freeze dry mode position to a pre-seal/seal position.

5. The method of claim 1, further comprising a step of providing power for operation of the freeze drying mode with a first power source.

6. The method of claim 1, further comprising a step of providing power for operation of pre-seal/seal mode and exchange mode with a second power source.

7. The method of claim 1, further comprising a step of heating the medium while evacuating pressure from the freeze dryer.

8. The method of claim 1, further comprising a step of draining collected rust, particulates, and water from the sedimentary filter.

9. The method of claim 1, further comprising a step of enabling passage of air and oil composition through a reed valve in the vacuum pump to generate pressure in the reservoir, whereby the pressure enables flowage of the air and oil composition through the vacuum pump, the sedimentary filter, and the coalescing filter; whereby the coalescing filter coalesces water vapor, and the coalesced water vapor is trapped in the sedimentary filter or evaporates through the vent and the sublimated gas is coalesced back into the solid and trapped by the sedimentary filter.

10. The method of claim 1, wherein the step of circulating the oil composition between the freeze dryer and the vacuum pump, further comprises using the vacuum pump to move the oil composition through the coalescing filter by pushing the oil composition and clean air from an outer core of the coalescing filter and through the vacuum pump at pressure less than 2500 Torr.

11. A method for filtering an oil composition in a vacuum pump used with a freeze dryer, the method consisting of:
freezing a medium in a freeze dryer;
switching from a pre-seal/seal mode to a freeze dry mode;
evacuating, with a vacuum pump, pressure from the freeze dryer through a vacuum hose, the vacuum pump comprising a reservoir containing an oil, whereby the frozen medium sublimates from a solid to a sublimated gas, whereby the sublimated gas migrates from the freeze dryer into the oil in the vacuum pump to form a particulate gas mixed with the oil;
heating the medium while evacuating pressure from the freeze dryer;
monitoring, through a reservoir sight glass, a predetermined level of oil composition in the reservoir of the vacuum pump;
waiting a predetermined time for the vacuum pump to cool to a predetermined temperature;
opening an oil flow control valve;
circulating the oil composition throughout the vacuum pump, a coalescing filter and a sedimentary filter at a predetermined pressure, whereby pressure generated by the vacuum pump enables flowage of the oil composition;
at least partially collecting condensation and water vapor that evaporates from the oil through an exhaust hose;
at least partially collecting, in the sedimentary filter, rust, particulates, and water from the oil;
at least partially collecting, in the coalescing filter, water vapor and the particulate gas;
coalescing, in the coalescing filter, the water vapor, and the particulate gas into oil, water, and particulates, whereby the particulates in the particulate gas are at least partially separated from the gas;
separating, in the coalescing filter, the oil from the water and particulates, whereby the oil is rejuvenated for use with the oil composition;
injecting clean air through a vent and an exhaust hose into the rejuvenated oil;
at least partially collecting, in the sedimentary filter, water from the rejuvenated oil;
turning the vacuum off;
allowing the remaining oil in the static system to move to a clean oil section of the sedimentary filter;
switching from freeze dry mode position to exchange mode position,
exchanging hot oil with cool filtered oil and creating exchanged oil;
mixing air with the exchanged oil using a final filter;
waiting a predetermined amount of time;
switching on the rotary switch from exchange mode back to freeze dry mode.

12. The method of claim 11, further comprising a step of using a cooling fan to reduce heat emitted by the system.

13. A filter system for filtering an oil composition in a vacuum pump used with a freeze dryer, the system comprising:
a rotary switch that has a pre-seal/seal position, a freeze dry mode position; and an exchange mode position;
a vacuum pump comprising a check valve and a reservoir containing an oil composition, the vacuum pump operationally connected to a freeze dryer through a vacuum hose, the vacuum pump evacuating pressure from the freeze dryer;
a sedimentary filter;
a coalescing filter comprising a core;
wherein the coalescing filter at least partially collects water vapor and the particulate gas, the coalescing filter further coalescing the water vapor, and the particulate gas into oil, water, and particulates, whereby the particulates in the particulate gas are at least partially separated from the gas, the coalescing filter further separating the oil from the water and particulates, whereby the oil is rejuvenated for use with the oil composition;
a reed valve operational in the vacuum pump, the reed valve enabling passage of the oil composition and clean air for generating pressure in the reservoir of the vacuum pump;
an oil control valve controlling the generated pressure to a predetermined pressure during circulation of the oil composition, the oil control valve further maintaining the oil composition at a predetermined level in the vacuum pump;
a filter drain enabling selective passage of the rejuvenated oil from the coalescing filter to the reservoir in the vacuum pump;
a vent enabling passage of the clean air into the rejuvenated oil;

an exhaust hose in communication with the vent, the exhaust hose carrying the clean air to the rejuvenated oil;

a final filter that mixes air and oil; and an acoustic covering.

14. The system of claim 13 wherein the sedimentary filter at least partially collects rust, particulates, and water from the oil composition, for selective drainage.

15. The system of claim 13 wherein the coalescing filter is a 0.3 micron filter that causes the trapped water and particulates to coalesce back to water and particulate as the trapped water and particulates pass through the filter.

16. The system of claim 13 further comprising a reservoir sight glass for viewing a predetermined level of oil composition in the reservoir of the vacuum pump; wherein the level and pressure of oil are controlled by the oil flow control valve at a pressure less than 2500 Torr.

17. The system of claim 13 further comprising an oil drain valve fluidly coupled to the vacuum pump, the oil drain valve discharging the oil composition from the vacuum pump reservoir if the predetermined level of the oil composition rises above the reservoir sight glass.

18. The system of claim 13 further comprising a first power source for freeze drying mode.

19. The system of claim 13 further comprising a second power source for pre-seal/seal mode and exchange mode.

20. The system of claim 13 further comprising a fan to cool the system.

* * * * *